No. 805,743. PATENTED NOV. 28, 1905.
A. H. McCONNELL.
BAROMETER.
APPLICATION FILED JAN. 7, 1905.
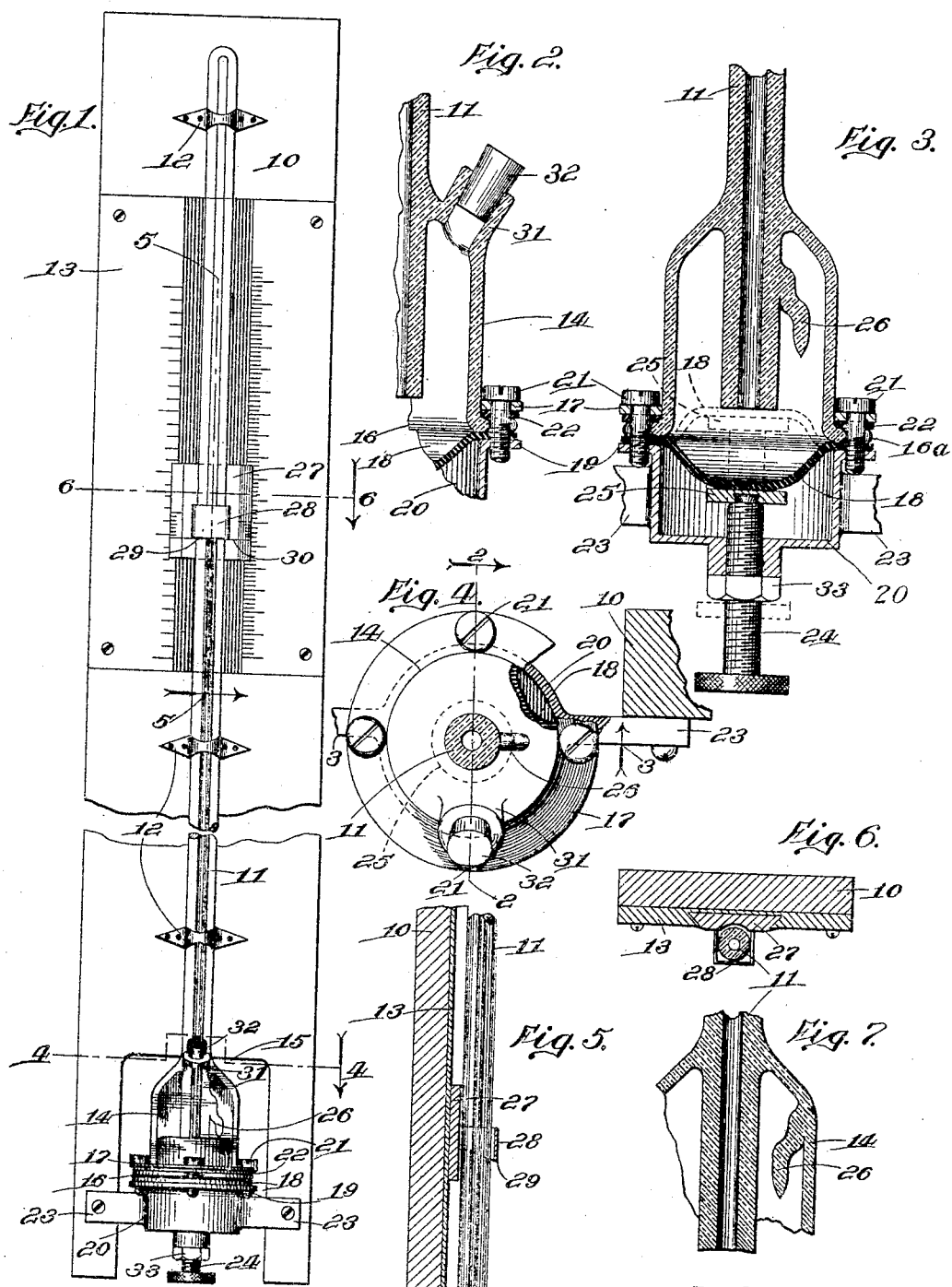

UNITED STATES PATENT OFFICE.

ALEXANDER H. McCONNELL, OF WILMETTE, ILLINOIS, ASSIGNOR TO CENTRAL SCIENTIFIC COMPANY, A CORPORATION OF ILLINOIS.

BAROMETER.

No. 805,743.  Specification of Letters Patent.  Patented Nov. 28, 1905.

Application filed January 7, 1905. Serial No. 240,062.

*To all whom it may concern:*

Be it known that I, ALEXANDER H. McCONNELL, a citizen of the United States, and a resident of Wilmette, county of Cook, and State of Illinois, have invented certain new and useful Improvements in Barometers, of which the following is a specification and which are illustrated in the accompanying drawings, forming a part thereof.

This invention relates to an instrument for measuring the pressure of gases in general, but particularly for measuring the pressure of the atmosphere. When especially constructed for this latter use the instrument is universally known as a "barometer."

The object of the invention is to simplify the construction of instruments of the kind described and so improve them that they shall be less susceptible to the changes in the temperature and humidity of the atmosphere, which changes tend to vitiate the results of the measurements obtained.

The invention consists in the construction and arrangement of parts to be hereinafter described and which are illustrated in the accompanying drawings, in which—

Figure 1 is a front elevation of a barometer constructed in accordance with the invention. Fig. 2 is a detail vertical section on the line 2 2 of Fig. 4. Fig. 3 is a detail section on the line 3 3 of Fig. 4. Figs. 4, 5, and 6 are sectional views on the lines 4 4, 5 5, and 6 6, respectively, of Fig. 1; and Fig. 7 is similar to Fig. 3, but showing a modification in the construction.

Instruments of the class to which that forming the subject of the invention belongs consist of a glass tube of considerable length whose base dips into a reservoir containing mercury and within which the mercury rises to a height varying with the pressure upon the surface of the mercury in the reservoir. When the device is intended for measuring the pressure of the atmosphere, the glass tube is closed at the top, and so much of the interior of the tube as is not filled by the mercury is a vacuum. As frequently constructed, this reservoir is provided with a flexible bottom, which may be raised or lowered in order to bring the surface of the mercury in the reservoir to some predetermined level, permanently marked, which coincides with the zero point or base for a scale of units of length, such as inches or centimeters, indicated along the side of the tube for as much of its length as will include the range of movement of the top of the mercury column when the instrument is in use. A supporting means is usually provided to which the tube and reservoir are permanently attached in order that the device may be portable. In the drawings such supporting means is shown as a wall-plate 10, to which the glass tube 11 is attached by means of the cleats 12 12. The scale is marked upon a plate 13, preferably of metal, secured to the wall-plate 10 behind the barometer-tube and of sufficient length to contain the proper graduations for indicating the height of the mercury column corresponding to the most extreme fluctuations in pressure to be measured. The base of the tube 11 enters a reservoir or inverted cup 14, which in the present instance is of glass and is formed integral with the walls of the tube and incloses its lower end. The wall-plate 10 is cut away below, as indicated at 15, to receive the reservoir and permit the tube 11 to lie close aganist its face. The lower edge of the reservoir is preferably flanged outwardly, as at 16, and there is provided a metal ring 17 of the proper size to surround the reservoir and bear upon this flange 16. The reservoir is closed by a sack 18, of some flexible material impervious to mercury, as leather. The rim of this sack is firmly bound to the flange 16 at the lower edge of the reservoir by the gripping action of the ring 17 and a flange 19 of a base-plate 20, which are drawn together by a plurality of set-screws 21, passing through recesses 16ª in the rim of the flange 16. The ring 17 is lined with a washer 22 in order that it may seat itself upon the glass flange. The base-plate 20 is chambered to receive the flexible sack 18, and is provided with wings 23 23, by means of which it may be secured to the wall-plate 10. A set-screw 24 enters the base-plate from below and is capped by a swiveled disk 25, which bears against the central portion of the flexible sack.

A downwardly-projecting permanent indicator-point 26, from the tip of which the graduations on the scale-plate 13 are measured, is provided within the chamber of the reservoir. It is formed of glass and is integral with the wall of such chamber. In Fig. 3 it is shown as formed upon the outer sur face of the tube 11, while in Fig. 7 it is shown as formed upon the inner surface of the outer wall of the reservoir 14.

As is usual in instruments of this kind, a vernier is provided which coöperates with the scale marked upon the plate 13 for obtaining an accurate reading of the height of the mercury column within the tube. In the preferred construction this vernier comprises a sliding block 27, dovetailed into the plate 13, as most clearly shown in Fig. 6, and having a tubular boss 28, which incloses the barometer-tube and has on its forward side a downwardly-extending lip formed into a horizontal knife-edge 29. This vernier is graduated, as is customary in devices of this kind to permit the reading of decimals of the smaller divisions on the scale-plate 13. The zero-line 30 of the vernier-scale is continued entirely across the face of the sliding block 27, and is exactly behind the knife-edge 29 of the tubular boss 28, so that in adjusting the instrument it may conveniently be determined when the zero-line 30 is precisely on a level with the top of the mercury column by sighting past the knife-edge 29. The reservoir 14 has an open side neck 31, and a closely-fitting stopper 32 is provided, which will ordinarily be inserted to prevent the entrance of dust and moisture.

When the device is to be used, the stopper 32 is removed for a few minutes in order that the atmospheric conditions within the reservoir may correspond exactly with those of the surrounding air, after which the set-screw 24 is adjusted until the surface of the mercury in the reservoir is brought accurately to the tip of the pointer 26. The vernier-plate 26 is then shifted until the top of the mercury column comes in line with the zero-point of the vernier-scale and the knife-edge 29, when the reading is noted in the usual manner.

In order that the jolting of the mercury within the tube and reservoir shall not do damage to the apparatus when the device is to be transported from place to place, the adjusting-screw 24 is raised until the flexible sack 18 is brought tightly in contact with the foot of the tube 11, as shown in dotted lines in Fig. 3. Under these conditions the glass tube 11 will be entirely filled with a column of mercury, which cannot escape, so as to jolt about and break the fragile parts of the instrument. A lock-nut 33 is employed on the shank of the set-screw 24 to insure its remaining in the desired adjusted position.

I claim as my invention—

1. In a barometer, in combination, an inverted cup; a tube extending upward from the cup and integral therewith, the lower end of the tube being prolonged into the chamber of the cup; a flexible closure for the mouth of the cup; and means for flexing the closure.

2. In a barometer, in combination, an inverted cup having an outstanding flange at its rim; a tube extending upwardly from the cup and integral therewith, the lower end of the tube being prolonged into the chamber of the cup; a flexible closure for the mouth of the cup; and means for flexing the closure.

3. In a barometer, in combination, a cup; a tube rising therefrom, the lower end of the tube being prolonged into the body of the cup; a zero-point projecting into the chamber between the cup and the tube and integral with the wall of such chamber; and means for varying the level of the liquid contents of the cup.

4. In a barometer, in combination, a cup; a tube rising therefrom; a zero-point projecting laterally from the tube and integral therewith; and means for varying the level of the liquid contents of the cup.

5. In a barometer, in combination, an inverted cup having an outstanding flange at its rim; a tube extending upwardly from the cup and integral therewith, the lower end of the tube being prolonged into the chamber of the cup; a flexible sack at the mouth of the cup; a flanged base-plate and a ring for gripping the rim of the sack and the flange of the cup; and a set-screw extending through the base-plate and bearing against the sack.

6. A barometer provided with an indicating liquid-containing vessel having integral with it a zero-point projecting into said chamber, and means for varying the level of the liquid contents of the vessel.

ALEXANDER H. McCONNELL.

Witnesses:
JNO. M. ROBERTS,
MARY DENISON.